US012516737B2

(12) United States Patent
Suzuki et al.

(10) Patent No.: US 12,516,737 B2
(45) Date of Patent: Jan. 6, 2026

(54) SLIDING COMPONENT

(71) Applicant: EAGLE INDUSTRY CO., LTD., Tokyo (JP)

(72) Inventors: Hiroshi Suzuki, Tokyo (JP); Yuichiro Tokunaga, Tokyo (JP); Ryoma Yamakawa, Tokyo (JP); Shogo Fukuda, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 88 days.

(21) Appl. No.: 18/027,600

(22) PCT Filed: Sep. 24, 2021

(86) PCT No.: PCT/JP2021/034992
§ 371 (c)(1),
(2) Date: Mar. 21, 2023

(87) PCT Pub. No.: WO2022/071090
PCT Pub. Date: Apr. 7, 2022

(65) Prior Publication Data
US 2023/0383845 A1    Nov. 30, 2023

(30) Foreign Application Priority Data

Sep. 29, 2020   (JP) ................................. 2020-163529

(51) Int. Cl.
*F16J 15/34*   (2006.01)
(52) U.S. Cl.
CPC ................. *F16J 15/3416* (2013.01)

(58) Field of Classification Search
CPC .. F16J 15/3416; F16J 15/3424; F16J 15/3428;
F16J 15/3412; F16J 15/3404
See application file for complete search history.

(56) References Cited

U.S. PATENT DOCUMENTS

| 3,433,489 A | 3/1969 | Wiese |
| 3,589,738 A | 6/1971 | Tracy |

(Continued)

FOREIGN PATENT DOCUMENTS

| CH | 677266 | 10/1987 | ............... F16J 15/34 |
| CN | 1100503 | 3/1995 | ............... F16J 15/16 |

(Continued)

OTHER PUBLICATIONS

International Search Report and Written Opinion and International Preliminary Report on Patentability issued in PCT/JP2021/037441, dated Nov. 22, 2021, with English translation, 28 pages.

(Continued)

*Primary Examiner* — Christine M Mills
*Assistant Examiner* — L. Susmitha Koneru
(74) *Attorney, Agent, or Firm* — HAYES SOLOWAY P.C.

(57) ABSTRACT

A sliding component capable of improving lubricity between sliding surfaces is provided. In a sliding component 10 which is disposed at a relatively rotating position of a rotary machine and relatively slides on a counter sliding component 20, a sliding surface 11 of the sliding component 10 is provided with a plurality of protrusions 30. A groove 14 is formed between the adjacent protrusions 30 so as to be continuous from a sealing side S1 to a leakage side S2.

11 Claims, 7 Drawing Sheets

(56) References Cited

U.S. PATENT DOCUMENTS

| | | | |
|---|---|---|---|
| 3,804,424 A | 4/1974 | Gerdner | F16J 15/34 |
| 3,917,289 A | 11/1975 | Ivanov et al. | |
| 4,534,569 A | 8/1985 | Ishitani et al. | |
| 4,613,141 A | 9/1986 | Heinen | |
| 4,749,199 A | 6/1988 | Gresh | |
| 4,889,348 A | 12/1989 | Amundson et al. | F16J 15/34 |
| 5,092,612 A | 3/1992 | Victor et al. | F16J 15/34 |
| 5,180,173 A | 1/1993 | Kimura et al. | F16J 15/34 |
| 5,441,283 A | 8/1995 | Pecht et al. | F16J 15/34 |
| 5,492,341 A | 2/1996 | Pecht et al. | F16J 15/34 |
| 6,059,293 A | 5/2000 | Azibert et al. | |
| 6,149,160 A | 11/2000 | Stephens et al. | F16J 15/34 |
| 6,157,515 A | 12/2000 | Boutaghou | |
| 6,280,090 B1 | 8/2001 | Stephens et al. | |
| 6,386,547 B2 | 5/2002 | Wu et al. | |
| 6,505,836 B1 | 1/2003 | Toshihiko | F16J 15/34 |
| 6,619,664 B1 | 9/2003 | Metz | |
| 7,758,051 B2 | 7/2010 | Roberts-Haritonov et al. | |
| 9,151,390 B2 | 10/2015 | Hosoe et al. | |
| 9,353,867 B2 | 5/2016 | Itadani et al. | F16J 15/3448 |
| 9,371,912 B2 | 6/2016 | Hosoe et al. | F16J 15/34 |
| 9,512,923 B2 | 12/2016 | Inoue et al. | F16J 16/34 |
| 9,677,670 B2 | 6/2017 | Itadani et al. | F16J 15/3412 |
| 9,765,892 B2 | 9/2017 | Itadani et al. | F16J 15/34 |
| 9,772,037 B2 | 9/2017 | Itadani et al. | F16J 15/3412 |
| 9,829,109 B2 | 11/2017 | Itadani et al. | F16J 15/40 |
| 9,841,106 B2 | 12/2017 | Itadani et al. | F16J 15/34 |
| 9,850,953 B2 | 12/2017 | Tokunaga | F16C 33/741 |
| 10,337,560 B2 | 7/2019 | Tokunaga et al. | F16J 15/40 |
| 10,415,707 B2 | 9/2019 | Bidkar et al. | |
| 10,473,220 B2 | 11/2019 | Tokunaga et al. | F16J 15/40 |
| 10,704,417 B2 | 7/2020 | Tokunaga et al. | F01D 25/16 |
| 2001/0010416 A1 | 8/2001 | Wu et al. | F16J 15/40 |
| 2002/0079648 A1 | 6/2002 | Uth | F16J 15/34 |
| 2012/0018957 A1 | 1/2012 | Watanbe | F16J 15/34 |
| 2012/0280458 A1 | 11/2012 | Artiles et al. | F16J 15/44 |
| 2014/0197600 A1 | 7/2014 | Hosoe et al. | F16J 16/40 |
| 2014/0217676 A1 | 8/2014 | Hosoe et al. | F16J 15/34 |
| 2015/0097341 A1 | 4/2015 | Inoue et al. | F16J 15/3424 |
| 2015/0115537 A1 | 4/2015 | Tokunaga | F16J 15/34 |
| 2015/0123350 A1 | 5/2015 | Itadani et al. | F16J 15/3412 |
| 2016/0033045 A1* | 2/2016 | Itadani | F16J 15/348 277/348 |
| 2017/0350407 A1 | 12/2017 | Yamamoto et al. | F04D 29/046 |
| 2018/0003069 A1 | 1/2018 | Bidkar et al. | |
| 2018/0017101 A1 | 1/2018 | Bauduin et al. | |
| 2018/0073394 A1* | 3/2018 | Tokunaga | F16J 15/3412 |
| 2018/0128377 A1 | 5/2018 | Tokunaga et al. | F16J 15/342 |
| 2018/0135699 A1 | 5/2018 | Tokunaga et al. | F16C 33/80 |
| 2018/0172162 A1 | 6/2018 | Tokunaga et al. | F16J 15/34 |
| 2018/0299015 A1* | 10/2018 | Itadani | F16J 15/3448 |
| 2019/0285115 A1 | 9/2019 | Negishi et al. | F16C 17/04 |
| 2019/0301522 A1 | 10/2019 | Negishi et al. | F16J 17/026 |
| 2022/0106891 A1 | 4/2022 | Kojima | |
| 2024/0167569 A1 | 5/2024 | Kaleshian et al. | |

FOREIGN PATENT DOCUMENTS

| | | | |
|---|---|---|---|
| CN | 1364987 | 8/2002 | F16J 15/40 |
| CN | 101469771 | 7/2009 | F16J 15/40 |
| CN | 102483162 | 5/2012 | F16J 15/18 |
| CN | 103104707 | 5/2013 | F16J 15/16 |
| CN | 103122998 | 5/2013 | F16J 15/16 |
| CN | 103216626 | 7/2013 | F16J 15/40 |
| CN | 103732958 | 4/2014 | F16J 15/34 |
| CN | 103765060 | 4/2014 | F16J 15/34 |
| CN | 104169622 | 11/2014 | F16J 15/34 |
| CN | 104334939 | 2/2015 | F16J 15/34 |
| CN | 104919229 | 9/2015 | F16J 15/34 |
| CN | 105793628 | 7/2016 | F16J 15/34 |
| CN | 106015571 | 10/2016 | F16J 15/16 |
| CN | 106015580 | 10/2016 | F16J 15/34 |
| CN | 106104112 | 11/2016 | F16J 15/35 |
| CN | 106352093 | 1/2017 | F16J 15/34 |
| CN | 106763778 | 5/2017 | F16J 15/16 |
| CN | 106838323 | 6/2017 | F16J 15/16 |
| CN | 107387766 | 11/2017 | F16J 15/32 |
| CN | 107407424 | 11/2017 | F16J 15/34 |
| CN | 107532725 | 1/2018 | F16J 15/34 |
| CN | 107735604 | 2/2018 | F16J 15/34 |
| DE | 2444544 | 9/1974 | F16J 15/34 |
| DE | 69113539 | 1/1992 | F16J 15/34 |
| DE | 102008038396 | 2/2010 | F16J 15/34 |
| EP | 2977654 | 1/2016 | F16J 15/34 |
| EP | 3091258 | 11/2016 | F16J 15/34 |
| EP | 3543569 | 9/2019 | F16J 15/34 |
| FR | 2342440 | 9/1977 | F16J 15/34 |
| JP | 50-45155 | 4/1975 | F16J 15/34 |
| JP | 50-144157 | 11/1975 | F16J 15/34 |
| JP | 56-15856 | 2/1981 | F16J 15/34 |
| JP | 64-46068 | 2/1989 | F16J 15/34 |
| JP | 4-50559 | 2/1992 | F16J 15/34 |
| JP | 5-164249 | 6/1993 | F16J 15/34 |
| JP | 7-12236 | 1/1995 | F16J 15/34 |
| JP | 7-71618 | 3/1995 | F16J 15/34 |
| JP | 8-502809 | 3/1996 | F16J 15/34 |
| JP | 8-303606 | 11/1996 | F16J 15/34 |
| JP | 3079562 | 6/2000 | F16J 15/34 |
| JP | 2002-508490 | 3/2002 | F16J 15/34 |
| JP | 2002-286026 | 10/2002 | F16C 17/02 |
| JP | 2009-250432 | 10/2009 | F16J 15/34 |
| JP | 2011-74931 | 4/2011 | F16J 15/34 |
| JP | 2012-2295 | 1/2012 | F16J 15/34 |
| JP | 2012-159152 | 8/2012 | F16J 15/34 |
| JP | 2014-173700 | 9/2014 | F16J 15/34 |
| JP | 2017-141962 | 8/2017 | F16J 15/34 |
| JP | 2018-200068 | 12/2018 | F16J 15/34 |
| WO | WO9506212 | 3/1995 | F16J 15/34 |
| WO | WO0075540 | 12/2000 | |
| WO | WO2012046749 | 4/2012 | F16C 17/04 |
| WO | WO2013035502 | 3/2013 | F16J 15/34 |
| WO | WO2013035503 | 3/2013 | F16J 15/34 |
| WO | WO2013176009 | 11/2013 | F16J 15/34 |
| WO | WO2014024742 | 2/2014 | F16J 15/34 |
| WO | WO2014148317 | 9/2014 | F16J 15/34 |
| WO | WO2015199171 | 12/2015 | F16J 15/34 |
| WO | WO2015199172 | 12/2015 | F16J 15/34 |
| WO | WO2016167262 | 10/2016 | F16J 15/34 |
| WO | WO2016186015 | 11/2016 | F16J 15/34 |
| WO | WO2016186019 | 11/2016 | F16J 15/08 |
| WO | WO2016203878 | 12/2016 | F16J 15/34 |
| WO | WO2017061406 | 4/2017 | F16J 15/34 |
| WO | WO2018092742 | 5/2018 | F16J 15/34 |
| WO | WO2018105505 | 6/2018 | F16C 33/12 |
| WO | 2018-138796 | 9/2018 | F16J 15/34 |
| WO | WO2020144733 A1 | 7/2020 | |

OTHER PUBLICATIONS

International Search Report and Written Opinion and International Preliminary Report on Patentability issued in PCT/JP2021/034992, dated Nov. 2, 2021, with English translation, 30 pages.

Korean Official Action issued in related Korean Application Serial No. 10-2023-70111146, dated Nov. 22, 2024, 11 pages.

Korean Official Action issued in related Korean Application Serial No. 10-2023-7013249, dated Dec. 8, 2024, 13 pages.

U.S. Appl. No. 18/030,979, filed Apr. 7, 2023, Maetani et al.

European Search Report issued in related European Application Serial No. 21875392.9, dated Oct. 4, 2024, 7 pages.

European Search Report issued in related European Application Serial No. 21880017.5, dated Oct. 18, 2024, 8 pages.

Official Action issued in related U.S. Appl. No. 18/030,979, dated Sep. 24, 2024, 7 pages.

\* cited by examiner

SLIDING COMPONENT

TECHNICAL FIELD

The present invention relates to a sliding component rotating relative to a counter sliding component and, for example, sliding components used for shaft sealing devices that seal rotation shafts of rotary machines of automobiles, general industrial machines, or other seal fields or sliding components used for bearings of machines of automobiles, general industrial machines, or other bearing fields.

BACKGROUND ART

As a shaft sealing device that prevents a leakage of a sealed fluid, for example, a mechanical seal includes a pair of annular sliding components which rotate relative to each other and has sliding surfaces sliding on each other. In such a mechanical seal, in recent years, it is desired to reduce the energy lost due to sliding for environmental measures and the like.

For example, in the mechanical seal illustrated in Patent Citation 1, a pair of annular sliding components is relatively rotatable, a sealed fluid exists in an outer space, and a liquid having a pressure higher than that of the sealed fluid exists in an inner space. One sliding component is provided with a plurality of grooves formed in the circumferential direction and each groove is formed by cutting a sliding surface, communicates with an inner space in which a high-pressure liquid exists, and has a closed outer radial end. Further, when the pair of sliding components relatively rotates at a high speed, the high-pressure liquid existing in the inner space is introduced into the groove, a positive pressure is generated at the outer radial end and in the vicinity thereof, and the sliding surfaces of the pair of sliding components are slightly separated from each other to form a liquid film. Accordingly, low friction is realized.

CITATION LIST

Patent Literature

Patent Citation 1: JP 64-46068 A (Page 3, FIG. 2)

SUMMARY OF INVENTION

Technical Problem

In the sliding component of Patent Citation 1, in the high-speed rotation, a dynamic pressure is generated by the groove formed on the sliding surface of one sliding component and the sliding surfaces are slightly separated from each other to form a liquid film. Accordingly, the lubricity between the sliding surfaces can be improved. However, since a land portion surrounding the groove forms a flat surface, the land portion comes into surface-contact with the sliding surface of the other sliding component in a stop state. Therefore, since insufficient lubrication occurs partially between the sliding surfaces in the relative rotation start state and the low-speed rotation state, there is a risk of causing an increase in torque, abrasion of the sliding surface, and the like.

The present invention has been made in view of such problems and an object thereof is to provide a sliding component capable of improving lubricity between sliding surfaces.

Solution to Problem

In order to solve the foregoing problem, a sliding component according the present invention is a sliding component which is disposed at a relatively rotating position of a rotary machine and relatively slides on a counter sliding component, wherein a sliding surface of the sliding component is provided with a plurality of protrusions and a groove is formed between the adjacent protrusions so as to be continuous from a sealing side to a leakage side. According to the aforesaid feature of the present invention, it is possible to introduce a fluid to the entire sliding surface from the sealing side to the leakage side through the groove formed between the plurality of protrusions forming the sliding surface. Therefore, it is possible to improve the lubricity between the sliding surfaces.

It may be preferable that the sliding surface has at least two regions having different arrangement densities of the protrusions. According to this preferable configuration, it is possible to change the arrangement density of the protrusion according to the function required for each region of the sliding surface. Therefore, it is possible to control the lubricity or sealing performance.

It may be preferable that the sliding surface is further provided with a dynamic pressure generation concave portion and the groove may be formed to face the dynamic pressure generation concave portion. According to this preferable configuration, a fluid introduced to the dynamic pressure generation concave portion is introduced to the land portion surrounding the dynamic pressure generation concave portion through the groove facing the dynamic pressure generation concave portion. Therefore, it is possible to improve the lubricity between the sliding surfaces.

It may be preferable that the regions include a first region facing the dynamic pressure generation concave portion and a second region adjacent to the first region, and the arrangement density of the protrusion in the first region is higher than the arrangement density of the protrusion in the second region. According to this preferable configuration, it is possible to reduce the amount of the fluid, introduced to the dynamic pressure generation concave portion, introduced to the land portion through the groove formed by the protrusion in the first region facing the dynamic pressure generation concave portion in a high-speed rotation. Therefore, it is easy to generate a dynamic pressure by the dynamic pressure generation concave portion.

It may be preferable that the regions include a third region facing the leakage side and a fourth region adjacent to the third region, and the arrangement density of the protrusion in the third region is higher than the arrangement density of the protrusion in the fourth region. According to this preferable configuration, it is possible to reduce the amount of the fluid, introduced to the entire sliding surface through the groove, leaking through the groove formed by the protrusion in the third region facing the leakage side space. Therefore, it is possible to improve the sealing performance between the sliding surfaces.

It may be preferable that the plurality of protrusions are arranged with regularity and each of the protrusions has a dot shape. According to this preferable configuration, it is possible to change the pattern of the groove by the arrangement density of the protrusion.

It may be preferable that the protrusions are fixed to a base material. According to this preferable configuration, it is easy to form a pattern of the groove on the sliding surface.

DESCRIPTION OF EMBODIMENTS

Figure 1:
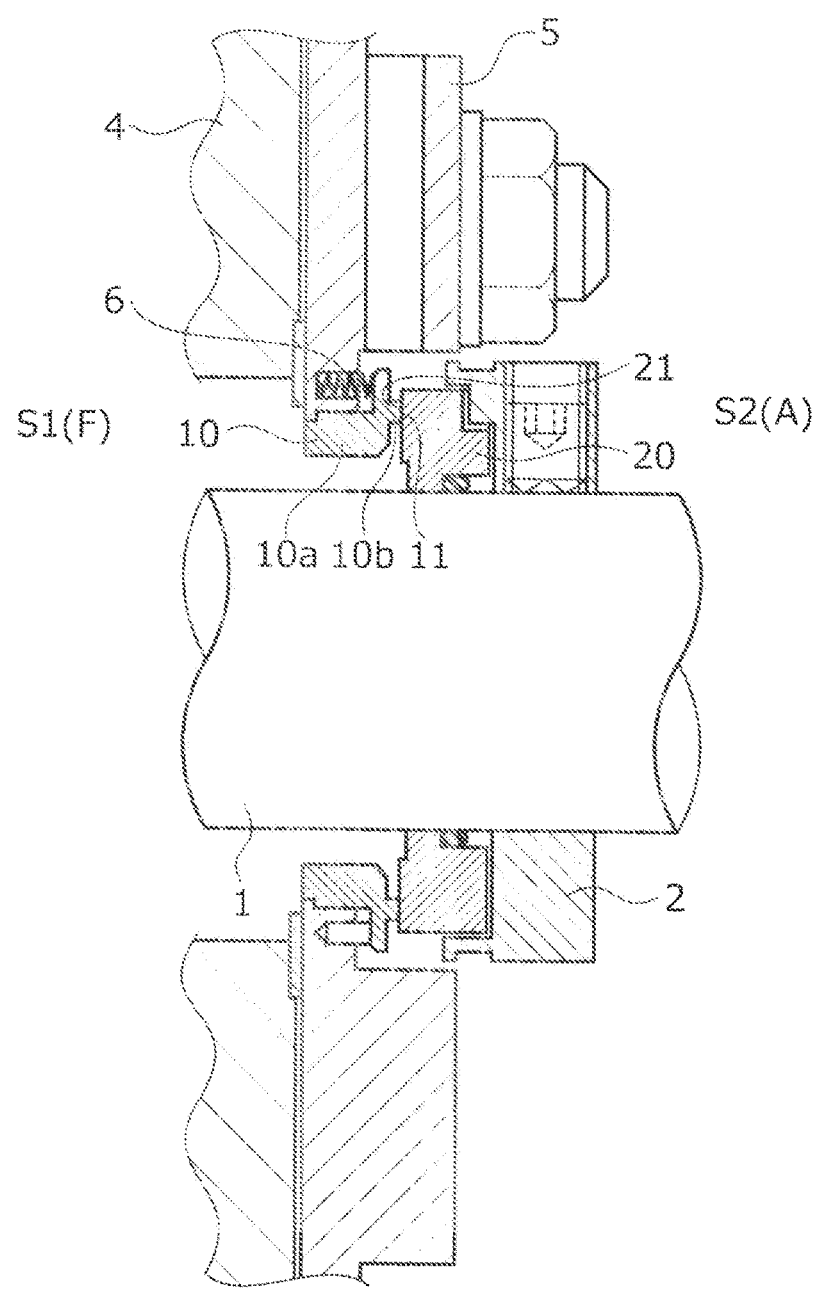
FIG. 1 is a cross-sectional view illustrating an example of a mechanical seal including a sliding component according to a first embodiment of the present invention.

Modes for carrying out a sliding component according to the present invention will be described with reference to embodiments.

First Embodiment

A sliding component according to a first embodiment of the present invention will be described with reference to FIGS. 1 to 4. Additionally, in this embodiment, an embodiment in which a sliding component is a mechanical seal will be described as an example. Further, a description will be made such that a sealed fluid exists in an inner space of the mechanical seal, an atmosphere exists in an outer space, an inner radial side of a sliding component constituting the mechanical seal is a sealed fluid side (high pressure side), and an outer radial side is a leakage side (low pressure side). Further, for convenience of description, in the drawings, dots may be added to land portions and the like formed on the sliding surface.

A mechanical seal for general industrial machinery illustrated in FIG. 1 is of an outside type in which a sealed fluid F trying to leak from an inner radial side of a sliding surface, that is, an inner space S1 corresponding to a sealing side space toward an outer radial side of the sliding surface, that is, an outer space S2 corresponding to a leakage side space and the outer space S2 communicates with the atmosphere A. Additionally, in this embodiment, an embodiment will be illustrated in which the sealed fluid F is a high-pressure liquid and the atmosphere A is a gas having a pressure lower than that of the sealed fluid F.

The mechanical seal mainly includes an annular stationary seal ring 10 which is a sliding component and an annular rotating seal ring 20 which is the other sliding component. The rotating seal ring 20 is provided in a rotation shaft 1 through a sleeve 2 to be rotatable together with the rotation shaft 1. The stationary seal ring 10 is provided in a seal cover 5 fixed to a housing 4 of an attached device not to be rotatable and to be movable in the axial direction. Further, in the mechanical seal, when the stationary seal ring 10 is axially biased by an elastic member 6, a sliding surface 11 of the stationary seal ring 10 and a sliding surface 21 of the rotating seal ring 20 slide closely against each other. In addition, the sliding surface 21 of the rotating seal ring 20 is a flat surface and this flat surface is not provided with a recess such as a groove.

The stationary seal ring 10 and the rotating seal ring 20 of this embodiment are formed of SiC (silicon carbide). In addition, the stationary seal ring 10 and the rotating seal ring 20 are not limited to those formed of the same material and may be formed of different materials.

As illustrated in FIG. 1, the stationary seal ring 10 includes an annular protrusion portion 10b. The annular protrusion portion 10b axially protrudes from the base portion 10a formed in an annular shape toward the rotating seal ring 20. Further, the front end portion of the annular protrusion portion 10b is provided with the sliding surface 11 of the stationary seal ring 10.

Figure 2:
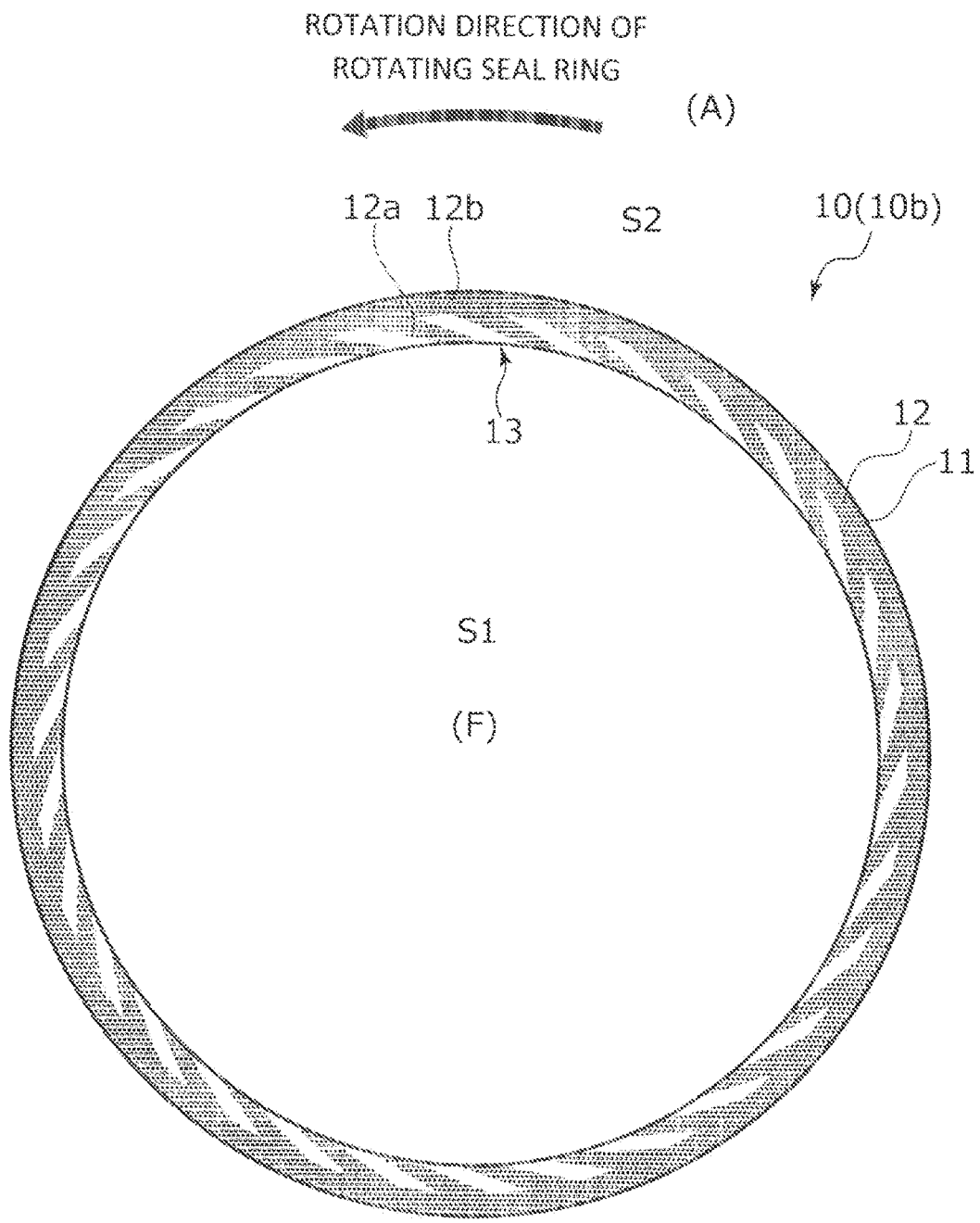
FIG. 2 is a view in which a sliding surface of a stationary seal ring in the first embodiment is viewed from an axial direction, where for convenience of description, only an annular protrusion portion of the stationary seal ring provided with the sliding surface is illustrated and a base portion is not illustrated.
Figure 3:
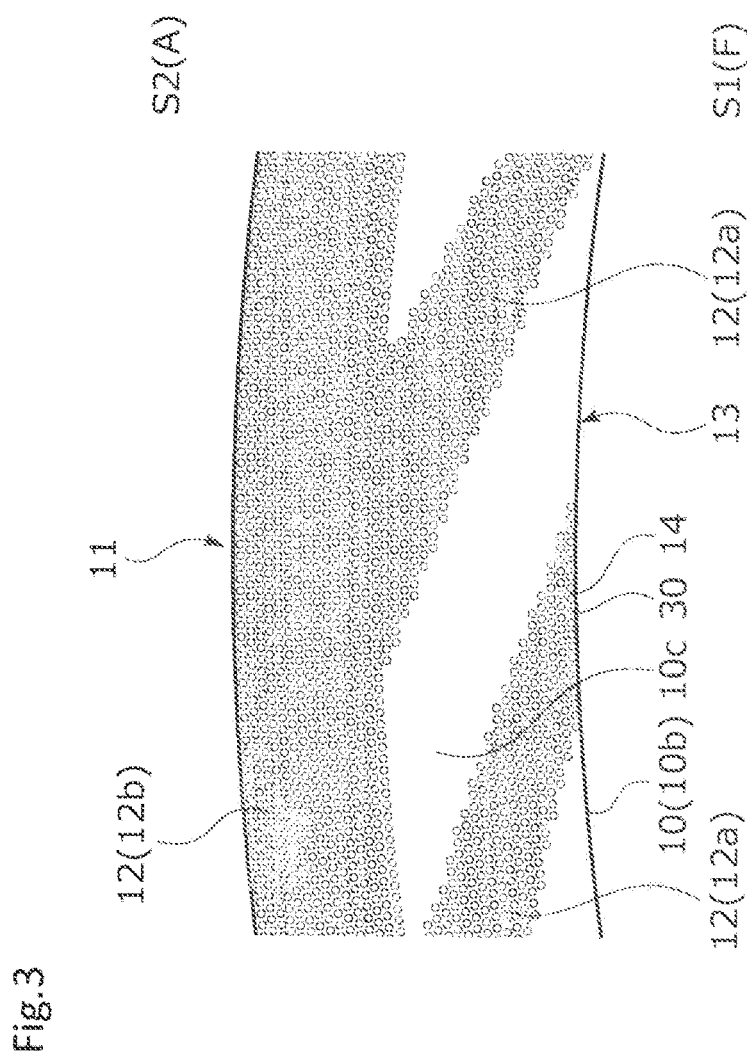
FIG. 3 is a schematic view in which a plurality of protrusions formed on the sliding surface of the stationary seal ring in the first embodiment and a pattern of grooves formed between the protrusions are viewed from an axial direction.
Figure 4:
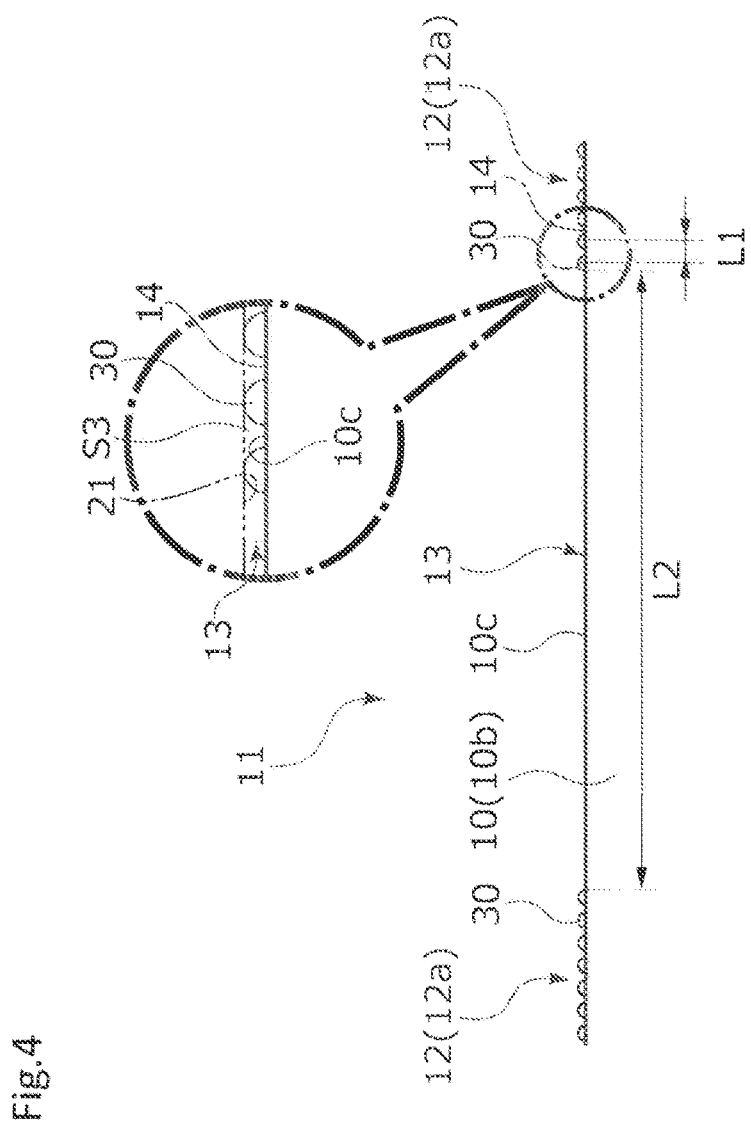
FIG. 4 is an enlarged schematic view in which the plurality of protrusions formed on the sliding surface of the stationary seal ring in the first embodiment and the pattern of grooves formed between the protrusions are viewed from a radial direction.

As illustrated in FIG. 2 to FIG. 4, the front end portion of the annular protrusion portion 10b of the stationary seal ring 10 is provided with a plurality of protrusions 30. The sliding surface 11 of the stationary seal ring 10 includes a land portion 12 and a plurality of dynamic pressure generation concave portions 13. The land portion 12 is formed by a plurality of fine protrusions 30 provided at the front end portion of the annular protrusion portion 10b. The plurality of dynamic pressure generation concave portions 13 are surrounded by the land portion 12 and are arranged at equal intervals in the circumferential direction. That is, the substantial sliding surface 11 which comes into contact with the sliding surface 21 of the rotating seal ring 20 of the stationary seal ring 10 is formed by the front end portions of the plurality of protrusions 30 forming the land portion 12. For convenience of description, the land portion 12 is schematically illustrated by dots in FIG. 2.

The land portion 12 includes a first land portion 12a and a second land portion 12b having an annular shape. The first land portion 12a is formed between the dynamic pressure generation concave portions 13 which are adjacent to each other in the circumferential direction. The second land portion 12b is formed on the outer radial side of the dynamic pressure generation concave portion 13.

The dynamic pressure generation concave portion 13 is formed by a region in which the protrusion 30 is not provided at the front end portion of the annular protrusion portion 10b. That is, the bottom surface of the dynamic pressure generation concave portion 13 is formed by a flat surface 10c of the annular protrusion portion 10b not provided with the protrusion 30 and a side wall portion erected from the bottom surface is formed by the plurality of protrusions 30 arranged at the boundary between the first land portion 12a and the second land portion 12b.

Additionally, in this embodiment, the dynamic pressure generation concave portion 13 is formed as an inclined groove of which the inner radial end communicates with the inner space S1 in which the sealed fluid F exists and the outer radial end is closed. Further, as illustrated in FIG. 2, the dynamic pressure generation concave portion 13 generates a dynamic pressure in such a manner that the rotating seal ring 20 relatively slides counterclockwise relative to the stationary seal ring 10 as indicated by the solid line arrow.

Next, the protrusion 30 will be described in detail. As illustrated in FIGS. 3 and 4, the protrusion 30 is fixed by applying granulated ceramic powder-containing ink to the flat surface 10c of the annular protrusion portion 10b as a base material by inkjet and then firing the ink. By firing the ceramic powder-containing ink, the adhesion of the protrusion 30 to the base material can be improved.

The ceramic powder contained in the ink is preferably the same material as the base material, that is, SiC powder in this embodiment, from the viewpoint of adhesion of the protrusions 30 to the base material. Further, the ceramic powder contained in the ink may be other ceramic powder different from the base material.

As illustrated in FIG. 3, the plurality of protrusions 30 forming the land portion 12 are formed substantially uniformly with regularity when the sliding surface 11 is viewed from the axial direction. Further, each protrusion 30 has a dot shape. That is, the protrusions may be arranged substantially evenly in the circumferential direction or the radial direction or rows of protrusions adjacent to rows of protrusions arranged in each direction may be arranged in the same phase or may be arranged with a phase shift. That is, for example, in radially adjacent rows of the protrusions arranged in the circumferential direction with respect to one row of protrusions arranged in the circumferential direction, each protrusion may be arranged in the same phase in the radial direction or may be arranged in different phases in the radial direction. That is, having regularity means that one row of protrusions is arranged substantially evenly in an arbitrary direction. Further, as illustrated in FIG. 4, the protrusion 30 has a convex curved surface shape when the sliding surface 11 is viewed from the radial direction. That is, the protrusion 30 has a dome-shaped outer shape. In addition, the front end portions of the plurality of protrusions 30 forming the land portion 12 are arranged on the same plane and form the substantial sliding surface 11 of the stationary seal ring 10 as described above.

Further, the external dimension of the protrusion 30, specifically, the external dimension of the base end of the protrusion 30 fixed to the flat surface 10c of the annular protrusion portion 10b may be freely set. From the viewpoint of holding the sealed fluid F in a groove 14 to be described later by surface tension, the external dimension is preferably 0.3 μm or more and 2 mm or less.

Further, the plurality of protrusions 30 forming the land portion 12 are regularly arranged in a staggered shape while being separated from each other at equal intervals. The mesh-shaped groove 14 which is continuous from the sealing side to the leakage side is formed so that the groove is continuous between the adjacent protrusions 30, that is, a space between two adjacent protrusions 30 and 30 is connected to a space between two adjacent other protrusions 30 and 30 in the plane direction of the sliding surface 11. Specifically, as illustrated in an enlarged part of FIG. 4, the bottom surface of the groove 14 is formed by the flat surface 10c of the annular protrusion portion 10b not provided with the protrusion 30 and the side wall portion erected from the bottom surface is formed by the plurality of protrusions 30. Further, in a stop state in which the rotating seal ring 20 does not rotate, a dynamic pressure is not generated by the dynamic pressure generation concave portion 13 and the stationary seal ring 10 is axially biased by the elastic member 6. Therefore, the front end portion of the protrusion 30 is in contact with the sliding surface 21 of the rotating seal ring 20. Further, a storage space S3 capable of storing the sealed fluid F by the groove 14 and the sliding surface 21 of the rotating seal ring 20 is defined between the sliding surfaces 11 and 21. In addition, the storage space S3 communicates with each of the inner space S1, the outer space S2, and the dynamic pressure generation concave portion 13.

Further, the separation dimension L1 of the adjacent protrusions 30, specifically, the separation dimension L1 between the geometric centers of the adjacent protrusions 30 (see FIG. 4) may be freely set, but is preferably 0.3 μm or more and 2 mm or less from the viewpoint of holding the sealed fluid F in the groove 14 by the surface tension. In addition, the separation dimension L1 of the adjacent protrusions 30 is, for example, much smaller than the width L2 (see FIG. 4) of the opening of the dynamic pressure generation concave portion 13 (i.e., L1<L2).

As described above, the sliding surface 11 of the stationary seal ring 10 is provided with the plurality of protrusions 30 forming the land portion 12 and the groove 14 which is continuous from the sealing side to the leakage side is formed so that the groove is continuous between the adjacent protrusions 30. Accordingly, since the sealed fluid F can be introduced to the entire sliding surface 11 from the sealing side to the leakage side through the groove 14 connected between the plurality of protrusions 30 forming the land portion 12, the lubricity between the sliding surfaces 11 and 21 can be improved. Further, the sealed fluid F introduced to the land portion 12 through the groove 14 is held around the plurality of fine protrusions 30 forming the groove 14 by the surface tension. Therefore, the lubricity between the sliding surfaces 11 and 21 can be maintained always.

Specifically, in a stop state in which the rotating seal ring 20 does not rotate, the sealed fluid F is held in the groove 14 by the surface tension. That is, the sealed fluid F is filled in the storage space S3 defined by the groove 14 and the sliding surface 21 of the rotating seal ring 20. Therefore, when the relative rotation starts, the sealed fluid F is supplied between the sliding surfaces 11 and 21 for a satisfactory lubrication state. Accordingly, low friction can be realized.

Further, a dynamic pressure is generated by the dynamic pressure generation concave portion 13 in a high-speed rotation of the rotating seal ring 20 so that the sliding surfaces 11 and 21 are slightly separated from each other and a liquid film is formed by the sealed fluid F. In this way, lubricity can be further improved not only in the high-speed rotation of the rotating seal ring 20 but also the low-speed rotation thereof.

Further, the groove 14 is formed to face the dynamic pressure generation concave portion 13 and the sealed fluid F introduced into the dynamic pressure generation concave portion 13 is introduced to the land portion 12, particularly, the first land portion 12a formed around the dynamic pressure generation concave portion 13 through the groove 14 facing the dynamic pressure generation concave portion 13. Therefore, the lubricity between the sliding surfaces 11 and 21 can be improved.

Further, since the protrusions 30 are formed with regularity in a substantially uniform manner and each protrusion 30 has a dot shape, the pattern of the groove 14 can be changed by adjusting the arrangement density of the protrusion 30. For example, it is possible to control lubricity and sealing performance by adjusting the introduction amount of the sealed fluid F to the land portion 12 in such a manner that the arrangement density of the protrusions 30 is decreased to form a groove of a pattern having a large flow path cross-sectional area or the arrangement density of the protrusions 30 is increased to form a groove of a pattern having a small flow path cross-sectional area.

Further, the protrusion 30 is formed by being fixed to the surface of the base material, that is, the flat surface 10c of the annular protrusion portion 10b. Therefore, it is easy to form a pattern of the groove 14 on the sliding surface 11 compared to a case of forming the groove by cutting the surface of the base material by laser or the like. Particularly, as in this embodiment, when the protrusion 30 is fine and the outer shape is a dome shape, the pattern of the groove 14 is very complicated. Accordingly, the sliding component can be easily manufactured by fixing the protrusion 30 to the surface of the base material by inkjet. In addition, as a method other than the inkjet, the protrusion 30 may be fixed by being laminated on the surface of the base material, for example, by a 3D printer.

Further, the protrusions 30 are formed by firing ceramic powder-containing ink and have numerous pores on the surface of the protrusions 30. Therefore, the sealed fluid F can be also held in these pores. Accordingly, the lubricity between the sliding surfaces 11 and 21 can be improved.

Further, the dynamic pressure generation concave portions 13 are evenly arranged in the circumferential direction of the sliding surface 11 and a dynamic pressure can be evenly generated between the sliding surfaces 11 and 21. Therefore, the liquid film is formed uniformly and the lubricity between the sliding surfaces 11 and 21 can be further improved.

Additionally, in the first embodiment, the dynamic pressure generation concave portion 13 generating a positive pressure has been described. However, even when the dynamic pressure generation concave portion generates a negative pressure and the sealed fluid F can be discharged from between the sliding surfaces 11 and 21 to the inner space S1, the sealed fluid F is held in the groove 14 by surface tension. Therefore, the lubrication state between the sliding surfaces 11 and 21 is easily maintained.

Second Embodiment

A sliding component according to a second embodiment of the present invention will be described with reference to FIGS. 5 and 6. Additionally, the description of the configuration which is the same as that of the first embodiment and overlaps will be omitted.

Figure 5:
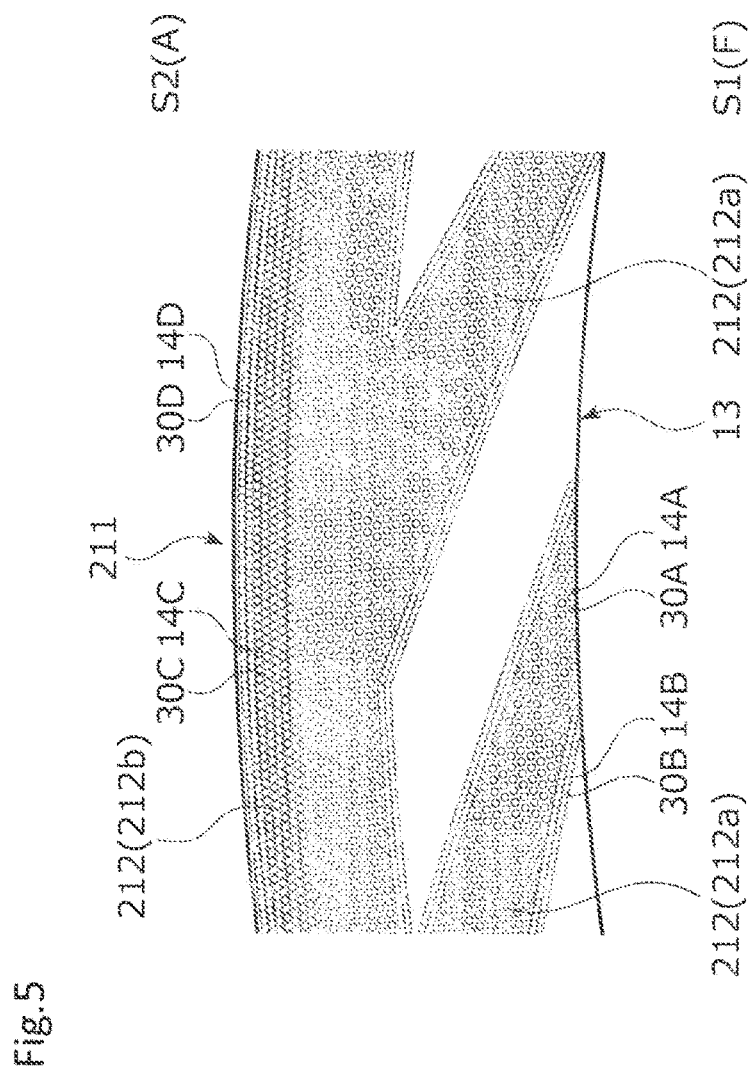
FIG. 5 is a schematic view in which a plurality of protrusions formed on a sliding surface of a stationary seal ring as a sliding component according to a second embodiment of the present invention and a pattern of grooves formed between the protrusions are viewed from an axial direction.
Figure 6A:
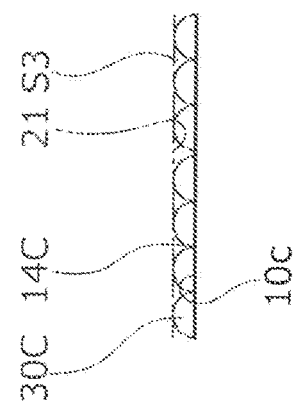
FIGS. 6A and 6B are enlarged schematic views in which the plurality of protrusions formed on the sliding surface of the stationary seal ring in the second embodiment and the pattern of grooves formed between the protrusions are viewed from a radial direction.
Figure 6B:
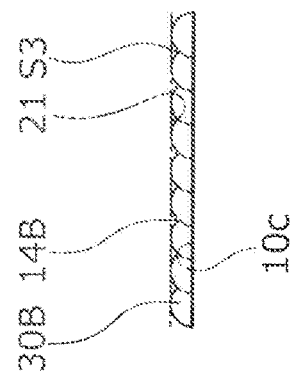

As illustrated in FIG. 5, in a stationary seal ring 210 which is a sliding component of the second embodiment, a plurality of regions having grooves 14A to 14D of different patterns are formed in a land portion 212 forming a sliding surface 211.

Specifically, adjacent protrusions 30A are separated from each other at equal intervals in a region between substantial center portions of a first land portion 212a and a second land portion 212b in the radial direction. The groove 14A formed between these protrusions 30A has the same pattern as that of the groove 14 formed between the adjacent protrusions 30 of the first embodiment (see an enlarged part of FIG. 4).

Further, in a boundary region with the dynamic pressure generation concave portion 13 in the first land portion 212a and the second land portion 212b, a part of a plurality of protrusions 30B facing the dynamic pressure generation concave portion 13 are arranged at the arrangement density higher than that of the protrusions 30A in the first land portion 212a and the second land portion 212b which are adjacent to each other in an overlapping state. Therefore, the groove 14B formed between these protrusions 30B has a pattern in which a flow path cross-sectional area is smaller than that of the groove 14A (see FIG. 6A).

Accordingly, the amount of the sealed fluid F, introduced to the dynamic pressure generation concave portion 13, introduced to the land portion 212 formed around the dynamic pressure generation concave portion 13 through the groove 14B facing the dynamic pressure generation concave portion 13 can be reduced in a high-speed rotation of the rotating seal ring 20. Therefore, it is easy to increase the pressure at the outer radial end of the dynamic pressure generation concave portion 13 and in the vicinity thereof in a high-speed rotation of the rotating seal ring 20 and to generate a dynamic pressure. Further, in the second embodiment, since two rows of protrusions 30B are arranged in a boundary region with the dynamic pressure generation concave portion 13, the amount of the sealed fluid F introduced to the land portion 212 through the groove 14B is further reduced. Additionally, the protrusions 30 may be arranged in one row.

Further, a pattern region of the groove 14C formed between the protrusions 30C is formed on the outer radial side of the second land portion 212b to be continuous to a pattern region of the groove 14A formed between the protrusions 30A. Specifically, the adjacent protrusions 30C contact each other at the base ends and the groove 14C formed between these protrusions 30C has a pattern in which a flow path cross-sectional area is smaller than that of the groove 14A and a flow path cross-sectional area is larger than that of the groove 14B (see FIG. 6B).

Further, in a boundary region with the outer space S2 in the second land portion 212b, a part of the plurality of protrusions 30D facing the outer space S2 are arranged at the density higher than the arrangement density of the protrusions 30C of the second land portions 212b which are adjacent to each other in an overlapping state. Accordingly, the groove 14D formed between these protrusion 30D has a pattern in which a flow path cross-sectional area is smaller than that of the groove 14C. Additionally, the groove 14D has the same pattern (see FIG. 6A) as that of the groove 14B as described above.

Accordingly, it is possible to reduce the amount of the sealed fluid F, introduced to the land portion 212 through the grooves 14A to 14C, leaking through the groove 14D facing the outer space S2 corresponding to the leakage side space. Therefore, the sealing performance between the sliding surfaces 211 and 21 can be increased.

Further, a region having a pattern of the groove 14A, a region having a pattern of the groove 14C with a flow path cross-sectional area smaller than that of the groove 14A, and a region having a pattern of the groove 14D with a flow path cross-sectional area smaller than that of the groove 14C are formed from the sealing side toward the leakage side in the second land portion 212b. Accordingly, the sealing performance between the sliding surfaces 211 and 21 is improved. Further, the amount of the sealed fluid F required to fill the storage space S3 defined by the sliding surface 21 of the rotating seal ring 20 and the grooves 14C and 14D having flow path cross-sectional areas smaller than that of the groove 14A is small on the outer radial side of the sliding surface 211 in a stop state in which the rotating seal ring 20 does not rotate. Accordingly, the sealed fluid F is supplied between the sliding surfaces 211 and 21 in the relative rotation start state and the low-speed rotation state, and it is easy to be a satisfactory lubrication state.

In this way, a plurality of regions having grooves 14A to 14D of different patterns are formed on the sliding surface 211 of the stationary seal ring 210 by changing the arrangement density of the protrusions 30A to 30D forming the land portion 212. Accordingly, it is possible to appropriately control the lubricity or sealing performance according to the function required for each region of the sliding surface 211.

Additionally, in the second embodiment, an embodiment in which a region having a pattern of the groove 14C is formed in the second land portion 212b has been described, but the present invention is not limited thereto. For example, the second land portion 212b may be formed only in the region of the pattern of the groove 14A up to the region having a pattern of the groove 14D at the boundary with the outer space S2. Further, a region having a pattern of a groove in which a flow path cross-sectional area is larger than that of the groove 14A may be formed in a boundary region with the inner space S1 in the first land portion 212a.

Further, in a boundary region with the dynamic pressure generation concave portion 13 in the first land portion 212a and the second land portion 212b, a part of the plurality of protrusions 30B may overlap each other only at the outer radial end generating a positive pressure and in a region in the vicinity thereof and may be arranged at the arrangement density higher than the arrangement density of the protrusions 30B of the other region.

Although the embodiments of the present invention have been described above with reference to the drawings, the specific configuration is not limited to these examples, and any changes or additions that do not depart from the scope of the present invention are included in the present invention. For example, in the above-described embodiments, the mechanical seal for general industrial machinery has been described as an example of the sliding component, but may be the other mechanical seal for automobiles or the like. Further, the present invention is not limited to the mechanical seal and a sliding component other than the mechanical seal, such as a slide bearing, may be used.

Further, in the above-described embodiments, an example in which the plurality of protrusions forming the land portion and the dynamic pressure generation concave portion are provided in the stationary seal ring has been described, but the plurality of protrusions forming the land portion and the dynamic pressure generation concave portion may be provided in the rotating seal ring.

Further, in the above-described embodiments, the plurality of protrusions forming the land portion are evenly formed when the sliding surface is viewed from the axial direction, but the present invention is not limited thereto. For example, each protrusion may be formed with a different size.

Further, the outer shape of the protrusion is not limited to a dome shape and may be formed in other shapes such as a columnar shape, a prismatic shape, a conical shape, and a pyramidal shape.

Figure 7A:
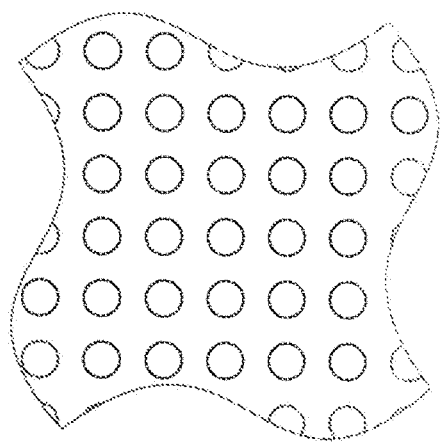
FIGS. 7A and 7B are schematic views in which a plurality of protrusions of a modified example in the embodiments of the present invention and a pattern of grooves formed between the protrusions are viewed from an axial direction.
Figure 7B:
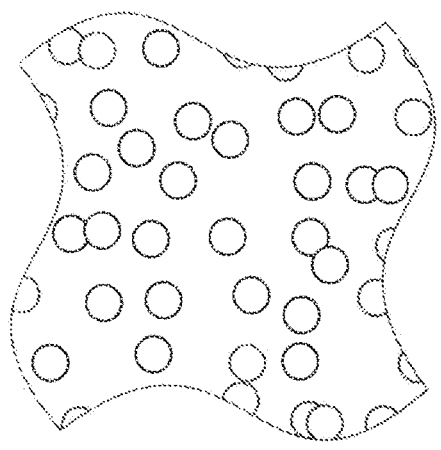

Further, the protrusions are regularly arranged in a staggered shape at equal intervals, but the present invention is not limited thereto. For example, the protrusions may be regularly arranged in a grid pattern at equal intervals as in the modified example of FIG. 7A or the protrusions may be randomly arranged without regularity as in the modified example of FIG. 7B.

Further, the protrusions may be formed of a material other than ceramic powder, such as resin such as PTFE, which has low friction properties.

Further, in the above-described embodiments, the bottom surface of the dynamic pressure generation concave portion is formed by the surface of the base material, but the present invention is not limited thereto. For example, the bottom surface of the dynamic pressure generation concave portion may be formed by a layered surface in which the same material as the protrusion is layered on the surface of the base material.

Further, in the above-described embodiments, the dynamic pressure generation concave portion has been described as the inclined groove communicating with the inner space, but the present invention is not limited thereto. For example, the dynamic pressure generation concave portion may not communicate with the inner space or the outer space if a dynamic pressure can be generated.

Further, the dynamic pressure generation concave portion is not limited to the inclined groove and may be formed by, for example, dimples.

Further, the sliding surface of the sliding component may not be provided with the dynamic pressure generation concave portion and may be provided with a concave portion for holding a fluid by introducing the fluid thereto and the entire sliding surface may be formed by the plurality of protrusions without the concave portion.

Further, the sealed fluid side has been described as a high pressure side and the leakage side has been described as a low pressure side. However, the sealed fluid side may be a low pressure side, the leakage side may be a high pressure side, and the sealed fluid side and the leakage side may have substantially the same pressure.

Further, in the above-described embodiments, the sealed fluid F has been described as the high-pressure liquid, but the present invention is not limited thereto. For example, the sealed fluid may be a gas, a low-pressure liquid, or a mist obtained by mixing a liquid and a gas.

Further, in the above-described embodiments, the fluid on the leakage side has been described as the atmosphere A which is the low-pressure gas, but the present invention is not limited thereto. For example, the fluid may be a liquid, a high-pressure gas, or a mist obtained by mixing a liquid and a gas.

Further, the sliding component is not limited to that applied to the outside type mechanical seal and may be applied to the inside type mechanical seal.

REFERENCE SIGNS LIST

10 Stationary seal ring (sliding component)
10a Base portion
10b Annular protrusion portion (base material)
10c Flat surface (surface of base material)
11 Sliding surface
12 Land portion
13 Dynamic pressure generation concave portion
14 Groove
14A to 14D Groove
20 Rotating seal ring (counter sliding component)
21 Sliding surface
30 Protrusion
30A to 30D Protrusion
210 Stationary seal ring (sliding component)
211 Sliding surface
212 Land portion
A Atmosphere
F Sealed fluid
S1 Inner space (sealing side space)
S2 Outer space (leakage side space)
S3 Storage space

The invention claimed is:

1. A sliding component which is disposed at a relatively rotating position of a rotary machine and relatively slides on a counter sliding component, wherein a sliding surface of the sliding component is provided with a plurality of protrusions and a groove is formed between adjacent protrusions so as to be continuous from a sealing side to a leakage side, wherein the plurality of protrusions collectively forms a land which is constituted by a plurality of first land portions arranged in circumferential direction and a second land portion formed to be continuous to each of the protrusions, wherein the sliding surface is further provided with a plurality of a dynamic pressure generation concave portions each of which is defined by one of side surfaces of the second land portion arranged in the circumferential direction and two of side surfaces of the first land portions facing each other in the circumferential direction, wherein each of the dynamic pressure generation concave portions communicates with the groove, and wherein arrangement density of the protrusions in the land is larger than arrangement density of the protrusions in the dynamic pressure generation concave portions.

2. The sliding component according to claim 1, wherein the land includes a first region facing the dynamic pressure generation concave portions and a second region adjacent to the first region, and the arrangement density of the protrusion in the first region is higher than the arrangement density of the protrusion in the second region.

3. The sliding component according to claim 1, wherein the and include a third region facing the leakage side and a fourth region adjacent to the third region, and the arrangement density of the protrusions in the third region is higher than the arrangement density of the protrusions in the fourth region.

4. The sliding component according to claim 1, wherein the plurality of protrusions are arranged with regularity and each of the protrusions has a dot shape.

5. The sliding component according to claim 1, wherein the plurality of protrusions are fixed to a base material.

6. The sliding component according to claim 2, wherein the plurality of protrusions are arranged with regularity and each of the protrusions has a dot shape.

7. The sliding component according to claim 2, wherein the is plurality of protrusions are fixed to a base material.

8. The sliding component according to claim 3, wherein the plurality of protrusions are arranged with regularity and each of the protrusions has a dot shape.

9. The sliding component according to claim 3, wherein the plurality of protrusions are fixed to a base material.

10. The sliding component according to claim 4, wherein the plurality of protrusions are fixed to a base material.

11. The sliding component according to The sliding component according to wherein the land includes plurality of regions which have different arrangement densities of the protrusions, and each of the different arrangement densities of protrusions is larger than the arrangement density of the protrusions in the dynamic pressure generation concave portions.

* * * * *